(12) United States Patent
Quadracci

(10) Patent No.: US 10,679,230 B2
(45) Date of Patent: Jun. 9, 2020

(54) ASSOCIATIVE MEMORY-BASED PROJECT MANAGEMENT SYSTEM

(75) Inventor: Leonard Jon Quadracci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 725 days.

(21) Appl. No.: 13/359,217

(22) Filed: Jan. 26, 2012

(65) Prior Publication Data

US 2013/0030852 A1 Jan. 31, 2013

Related U.S. Application Data

(63) Continuation-in-part of application No. 12/419,664, filed on Apr. 7, 2009, now Pat. No. 8,838,490.

(51) Int. Cl.
*G06Q 30/02* (2012.01)
*G06N 3/04* (2006.01)

(52) U.S. Cl.
CPC ....... *G06Q 30/0204* (2013.01); *G06N 3/0445* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,974,396 A | 10/1999 | Anderson et al. | |
| 6,925,460 B2 | 8/2005 | Kummamuru et al. | |
| 6,993,288 B2 | 1/2006 | de LaChapelle et al. | |
| 7,376,618 B1 | 5/2008 | Anderson et al. | |
| 7,478,090 B2 | 1/2009 | Aparicio, IV et al. | |
| 7,769,628 B2 | 8/2010 | Matthews et al. | |
| 2005/0209767 A1* | 9/2005 | Kim | G05B 23/024 701/100 |
| 2005/0222929 A1 | 10/2005 | Steier et al. | |

(Continued)

FOREIGN PATENT DOCUMENTS

| EP | 0520684 A2 | 12/1992 |
|---|---|---|
| WO | WO2010117534 A1 | 10/2010 |

(Continued)

OTHER PUBLICATIONS

Levitan et al., Associative Memory Study: Architectures and Technology, Jan. 2002, Air Force Research Laboratory.*

(Continued)

*Primary Examiner* — Russell S Glass
(74) *Attorney, Agent, or Firm* — Yee & Associates, P.C.

(57) ABSTRACT

A method and apparatus for managing information for projects is provided. Information for the projects is stored as data entities in an associative memory. The associative memory includes a plurality of data having a plurality of associations in which the data entities are included in the plurality of data. The associative memory further includes a content-addressable structure. The associative memory is configured to be queried based on at least one relationship selected from a group that includes direct relationships and indirect relationships among the plurality of data. The data entities stored in the associative memory are grouped to form a number of clusters. A report is generated using the number of clusters.

20 Claims, 9 Drawing Sheets

(56) References Cited

U.S. PATENT DOCUMENTS

| | | | |
|---|---|---|---|
| 2005/0240458 A1* | 10/2005 | Ciacciarelli | G06Q 10/06 705/7.12 |
| 2006/0069694 A1* | 3/2006 | Rossi | G06F 17/30398 |
| 2007/0067320 A1 | 3/2007 | Novak | |
| 2007/0203912 A1 | 8/2007 | Thuve et al. | |
| 2008/0189260 A1 | 8/2008 | Arnold et al. | |
| 2008/0229313 A1* | 9/2008 | Motoyama | G06F 9/54 718/102 |
| 2008/0313143 A1 | 12/2008 | Warn et al. | |
| 2008/0320042 A1 | 12/2008 | Arnold et al. | |
| 2009/0083207 A1 | 3/2009 | Aparicio, IV | |
| 2010/0205121 A1 | 8/2010 | Quadracci et al. | |
| 2010/0205192 A1 | 8/2010 | Quadracci et al. | |
| 2010/0205212 A1 | 8/2010 | Quadracci et al. | |
| 2010/0257006 A1 | 10/2010 | Quadracci et al. | |
| 2010/0268673 A1 | 10/2010 | Quadracci | |

FOREIGN PATENT DOCUMENTS

| | | |
|---|---|---|
| WO | WO2010138728 A2 | 12/2010 |
| WO | WO2011046684 A | 4/2011 |

OTHER PUBLICATIONS

Extended European Search Report, dated Apr. 22, 2013, regarding Application No. EP13152754.1, 7 pages.

PCT search report dated Jun. 18, 2010 regarding PCT/US2010/026695, applicant The Boeing Company, 13 Pages.

Bhattacharya et al., "Relational Clustering for Multi-type Entity Resolution," Fourth International Workshop on Multi-Relational Data Mining, Aug. 2005, 10 Pages.

Serrano-Cinca, "Self organizing neural networks for financial diagnosis," Decision Support Systems, vol. 17, No. 3, Jul. 1996, pp. 227-238.

Amendment after final rejection dated Dec. 6, 2011 regarding U.S. Appl. No. 12/419,665, 13 Pages.

USPTO final office action dated Oct. 4, 2011 regarding U.S. Appl. No. 12/419,664, 19 Pages.

USPTO non-final office action dated Apr. 5, 2011 regarding U.S. Appl. No. 12/419,664, 4 Pages.

Response to office action dated Jul. 27, 2011 regarding U.S. Appl. No. 12/419,664, 11 Pages.

Canadian Intellectual Property Office Examination Search Report, dated Dec. 4, 2015, regarding Application No. 2,793,400, 4 pages.

Japanese Patent Office Notice of Reasons for Rejection, dated Jan. 10, 2017, regarding Patent Application No. 2013-013196, 6 pages.

Canadian Intellectual Property Office Examination Search Report, dated Dec. 12, 2016, regarding Application No. 2,793,400, 3 pages.

Notice of Allowance, dated May 14, 2014, regarding U.S. Appl. No. 12/419,664, 7 pages.

Intellectual Property Office of the PRC Notification of Second Office Action, dated Jul. 27, 2017, regarding Application No. 20130030723.1, 13 pages.

Chinese Decision of Rejection dated Aug. 8, 2018 with translation, regarding Application No. 201310030723.1, 13 pages.

Brazilian Office Action dated Nov. 4, 2019 with translation, regarding Application No. BR102013001760-4, 6 pages.

* cited by examiner

```
BEGIN
    FOR EACH DATABASE RELATED TO A PROJECT*
        FOR EVERY PROJECT
            UPDATE Project_entities USING PROJECT DATA
        NEXT PROJECT
    NEXT DATABASE
RETURN
```

```
FOR EVERY Project_entity
    IF Project_entity IS NOT IN A CLUSTER
        ASSIGN Project_entity UNIQUE cluster_number
        FIND OTHER Project_entities THAT ARE SIMILAR (SORTED BY SIMILARITY)
        FOR EVERY similar_entity
            IF SIMILARITY > VALUE (AND NOT IN A BETTER CLUSTER)*
                ASSIGN similar_entity THE SAME UNIQUE cluster_number
            END IF
        NEXT similar_entity (SORTED BY SIMILARITY)
    END IF
NEXT PROJECT
RETURN
```

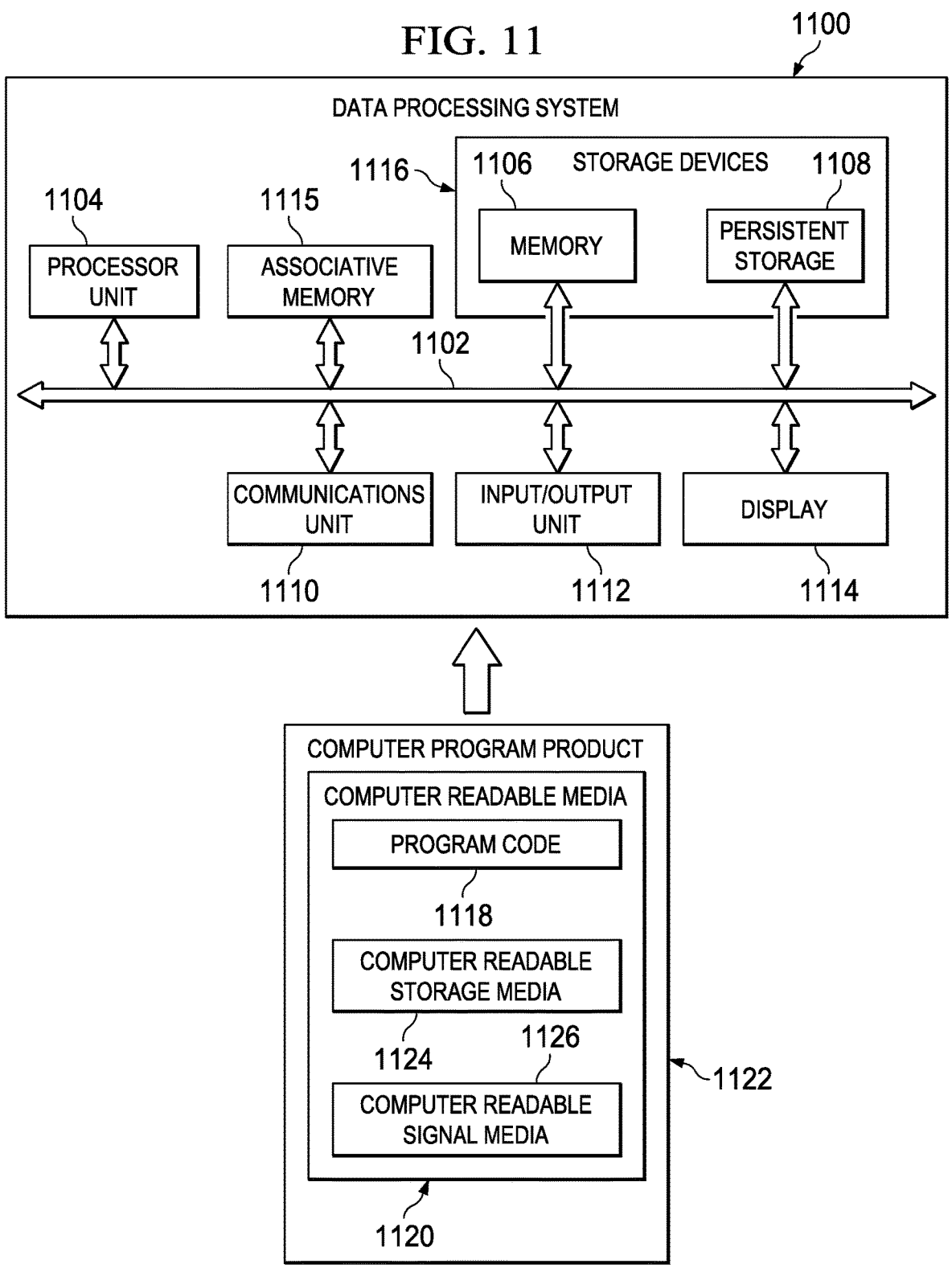

ASSOCIATIVE MEMORY-BASED PROJECT MANAGEMENT SYSTEM

CROSS-REFERENCE TO RELATED APPLICATION

This application is a continuation-in-part of patent application U.S. Ser. No. 12/419,664, filed Apr. 7, 2009, U.S. Publication No. 20100257006A1, published on Oct. 7, 2010, now U.S. Pat. No. 8,838,490, entitled "Associate Memory Learning for Analyzing Financial Transactions", which is incorporated herein by reference.

BACKGROUND INFORMATION

1. Field

The present disclosure relates to managing complex or large projects using an associative memory.

2. Background

Project management is an art as old as civilization itself. For example, ancient Egyptians managed the project of building the pyramids at Giza. However, the techniques of project management have been studied and refined in modern times in order to increase the efficiency of projects in terms of cost, time, and possibly other parameters.

For example, one business project management strategy developed in 1986 is known as SIX SIGMA®. One of several possible goals of the SIX SIGMA® project management strategy is to institute a manufacturing process which produces less than 3.4 defects per million product units manufactured. However, SIX SIGMA® is only one example of a business management or project management strategy.

Many such strategies exist, and software exists for aiding project management. Further, many different types of projects exist. One type of project may be manufacturing a large number of production units, or perhaps manufacturing a smaller number of very complex production units, such as aircraft. Other types of projects may include establishing a company, conducting research and development, establishing a space program, such as a program to send a manned mission to the planet Mars, and many other different types of projects. Thus, project management techniques may be applied to many different types of projects, and many different project management techniques exist. Yet further, multiple effective project management techniques may exist for each type of project.

As mentioned above, research and development (R&D) may be one type of project to which project management techniques might be applied. Research and development may refer to work directed towards developing different types of technologies. Different types of organizations may undertake different types of research and development projects. These different types of organizations may include, but are not limited to, governmental organizations, non-governmental organizations, international organizations, military organizations, companies, corporations, independent contractors, charities, nonprofit organizations, partnerships, hybrid organizations, and other suitable types of organizations. A hybrid organization may be an organization that operates in both the public sector and private sector.

An organization, such as a private company, may undertake different types of research and development projects. In some cases, a company may undertake hundreds to thousands of research and development projects over many years. As one illustrative example, a company may have multiple departments within the company. Each department within the company may be responsible for work on tens to hundreds of research and development projects. Additionally, in some cases, more than one department within the company may be responsible for tasks for the same research and development project.

As the number of research and development projects undertaken by a company increases, the difficulty of managing these research and development projects also may increase. Further, managing the information for these different research and development projects may become increasingly difficult as the number of research and development projects increases. Information for a research and development project may include, for example, but is not limited to, a list of tasks associated with the research and development project, an identification of a research and development project manager, a list of employees involved with the research and development project, a list of deliverables, a list of deadlines, a list of research and development project milestones, funding information, expense information, research logs, and/or other suitable types of information.

In some cases, information for the research and development projects in a company may be stored in a number of different locations and/or in a number of different formats. As the number of research and development projects increases, managing information that is stored in different locations and/or in different formats may become increasingly difficult and more time-consuming. Therefore, it would be desirable to have a method and apparatus that takes into account at least some of the issues discussed above as well as possibly other issues.

SUMMARY

In one illustrative embodiment, a method for managing information for projects is provided. Information for the projects may be stored as data entities in an associative memory. The associative memory may include a plurality of data having a plurality of associations in which the data entities are included in the plurality of data. The associative memory further may include a content-addressable structure. The associative memory may be configured to be queried based on at least one relationship selected from a group that includes direct relationships and indirect relationships among the plurality of data. The data entities stored in the associative memory may be grouped to form a number of clusters. A report may be generated using the number of clusters.

In another illustrative embodiment, an apparatus for managing information for projects may comprise a project manager and a project analyzer. The project manager may be configured to store the information for the projects as data entities in an associative memory. The associative memory may include a plurality of data having a plurality of associations in which the data entities are included in the plurality of data. The associative memory further may include a content-addressable structure. The associative memory may be configured to be queried based on at least one relationship selected from a group that includes direct relationships and indirect relationships among the plurality of data. The project analyzer may be configured to group the data entities stored in the associative memory to form a number of clusters. The project analyzer may be further configured to generate a report using the number of clusters.

In yet another illustrative embodiment, a computer system may comprise a bus, a non-transitory storage device connected to the bus, and a processor unit connected to the bus.

The non-transitory storage device may include program code. The processor unit may be configured to execute the program code to store information for projects as data entities in an associative memory. The processor unit may be further configured to group the data entities in the associative memory to form a number of clusters. The processor unit may be further configured to generate a report using the number of clusters. The associative memory may include a plurality of data having a plurality of associations. The data entities may be included in the plurality of data. The associative memory further may include a content-addressable structure. The associative memory may be configured to be queried based on at least one relationship selected from a group that includes direct relationships and indirect relationships among the plurality of data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 9 is an illustration of pseudocode for creating and loading an associative memory in accordance with an illustrative embodiment;

FIG. 10 is an illustration of pseudocode for forming clusters in accordance with an illustrative embodiment; and FIG. 11 is an illustration of a data processing system in accordance with an illustrative embodiment.

DETAILED DESCRIPTION

Figure 1:
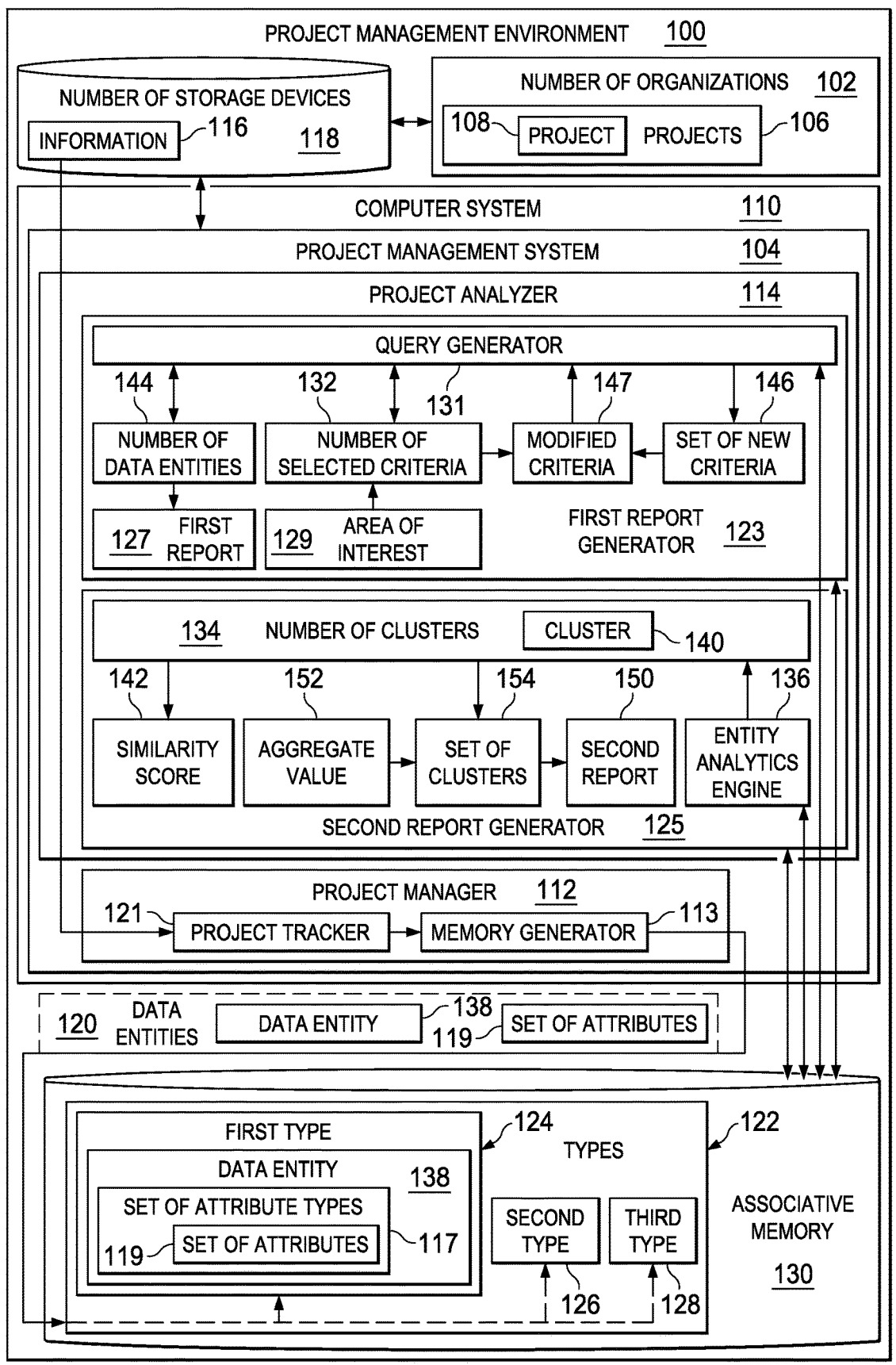
FIG. 1 is an illustration of a project management environment in the form of a block diagram in accordance with an illustrative embodiment.

The different illustrative embodiments recognize and take into account different considerations. For example, the different illustrative embodiments recognize and take into account that some currently available systems for managing projects may include performing manual analysis of the information for these projects. Manual analysis may be an analysis that is performed by a human operator, even if performed with the assistance of a computer. This type of analysis may require more time, effort, cost, and resources than desired.

Further, the different illustrative embodiments recognize and take into account that manual analysis may require a human operator with a certain level of experience or expertise. The amount of time, expense, and/or training needed for a human operator to gain this level of experience or expertise may be greater than desired.

The different illustrative embodiments also recognize and take into account that information for projects may be stored in different storage devices, in different locations, and in different formats. Tracking related information across multiple projects may be more difficult than desired when the information is stored in different storage devices, in different locations, and in different formats.

Additionally, the different illustrative embodiments also recognize and take into account that some currently available systems for identifying related projects among a plurality of projects may be unable to process substantially all of the information for the projects. For example, some currently available systems may select only certain pieces of information for a particular project for processing based on pre-defined characteristics.

The different illustrative embodiments also recognize and take into account that this type of reductive processing may cause relationships between pieces of information for different projects to be missed. For example, information that may be important for identifying that two projects are related may be excluded from processing when this information does not fit within the pre-defined characteristics.

The different illustrative embodiments recognize and take into account that having a system for grouping projects that are related without needing to reduce the amount of information for these projects during processing may be desirable. The different illustrative embodiments recognize and take into account that associative memory technology may allow vast amounts of information for projects to be collected and processed. Further, the different illustrative embodiments recognize and take into account that using an entity analytics engine with an associative memory may allow related projects and related information between projects to be grouped more accurately and quickly as compared to some currently available systems.

Thus, the different illustrative embodiments may provide a method and apparatus for managing information for projects. In particular, the different illustrative embodiments may provide a method and apparatus for managing information for projects stored in an associative memory. The illustrative embodiments also may be used in project management itself.

The illustrative embodiments described herein may be applied to research and development projects. However, the illustrative embodiments are not limited to research and development projects, and may be applied to many different types of projects. Thus, while the illustrative embodiments specifically may describe using an associative memory in the context of managing research and development projects, these descriptions are exemplary only and not limiting of the claimed inventions.

In one illustrative embodiment, a method may be provided for managing information for projects. The information for the projects may be stored as data entities in an associative memory. The associative memory may include a plurality of data having a plurality of associations in which the data entities are included in the plurality of data. Further, the associative memory may include a content-addressable structure. The associative memory may be configured to be queried based on at least one relationship selected from a group that includes direct relationships and indirect relationships among the plurality of data. The data entities stored in the associative memory may be grouped using a number of selected criteria to form a number of clusters. A report may be generated using the number of clusters.

With reference now to the figures, FIG. 1 is an illustration of a project management environment in the form of a block diagram depicted in accordance with an illustrative embodiment. Project management environment 100 may include number of organizations 102 and project management system 104. Project management system 104 may be configured to manage projects 106 undertaken by number of organizations 102.

As used herein, a "number of" items may mean one or more items. For example, a number of organizations means one or more organizations. Further, as used herein, an "organization" may refer to any type of social group which distributes tasks for a collective goal. An organization may take a number of different forms. For example, without limitation, an organization in number of organizations 102 may be selected from one of a governmental organization, a non-governmental organization, an international organization, a military organization, a company, a corporation, an independent contractor, a charity, a nonprofit organization, a partnership, a hybrid organization, or some other suitable type of organization. Any given organization may be part of a larger organization, such as a department within a multi-department corporation.

In these illustrative examples, number of organizations 102 may undertake projects 106. As used herein, a "project" may be a planned collaborative effort involving research, design, and/or development that is directed towards achieving a particular aim. As used herein, the term "project" is not limited to this definition, and may include any goal of human endeavor involving work and time. Project 108 may be an example of one of projects 106.

As one illustrative example, project 108 may be the manufacturing of an aircraft having a new design. As another example, project 108 may be the inspection of a mechanical system. Project 108 also may be the development of a new spacecraft. In yet another example, project 108 may be the development of a reconnaissance and surveillance mission algorithm.

Project management system 104 may be configured to manage projects 106. Project management system 104 may be implemented using hardware, software, or a combination of the two. For example, project management system 104 may be implemented using one or more data processing systems. These data processing systems may be in a distributed or networked environment. In some cases, project management system 104 may be implemented using a group of remotely administered data processing systems known as a "cloud". Further, project management system 104 may be characterized as including one or more modules that may be separate or part of a monolithic architecture.

In these illustrative examples, project management system 104 may be implemented in computer system 110. Computer system 110 may comprise a number of computers. When one or more computers are present in computer system 110, these computers may be in communication with each other. In some illustrative examples, computer system 110 may be implemented using data processing system 1100 in FIG. 11.

As depicted, project management system 104 may include project manager 112 and project analyzer 114. Project manager 112 may be configured to manage information 116 for projects 106. Information 116 may include, for example, without limitation, tasks, deliverables, a number of people, funds, cost, a timeline, deadlines, equipment, materials, files, logs, reports, and/or other suitable information for projects 106.

Information 116 may be stored in number of storage devices 118. One or more of number of storage devices 118 may be located in number of organizations 102, in a number of locations remote to number of organizations 102, or in a combination of the two. A storage device in number of storage devices 118 may be selected from memory, a server, a storage unit, a database, a file, a flash drive, or some other suitable type of storage device.

Project manager 112 may be configured to retrieve information 116 from number of storage devices 118. In one illustrative example, project manager 112 may use project tracker 121 to retrieve information 116 for projects 106. Project tracker 121 may be implemented using any number of project tracking applications. In these illustrative examples, project tracker 121 may be configured to retrieve information 116 in the form of free text. Free text also may be referred to as free-form text or unstructured data.

Further, project manager 112 may use memory generator 113 to identify data entities 120 using information 116 in the form of free text. As used herein, a "data entity" may be an item of data for a project in projects 106. A data entity may take a number of different forms. As one illustrative example, a data entity for project 108 may be a particular task to be performed for project 108. As another example, a data entity for project 108 may be a particular product manufactured as part of project 108.

Memory generator 113 may generate associative memory 130 using data entities 120. As used herein, an "associative memory" may include a plurality of data and a plurality of associations among the plurality of data. The plurality of data and the plurality of associations in an associative memory may be stored in a non-transitory computer readable storage medium. As used herein, a "plurality of" items may mean two or more items. For example, a plurality of associations may mean two or more associations. In some cases, the plurality of data may include, for example, compressed data, encrypted data, or a combination of the two.

The plurality of data may be collected into associated units of data, such as a first associated unit of data, a second associated unit of data, and a third associated unit of data. More or fewer associated units of data may be present. An associated unit of data may be two or more sets of data that are associated with each other in some manner.

An associative memory may be configured to be queried based on indirect relationships among the plurality of data in addition to direct correlations among the plurality of data. An associative memory may also be configured to be queried based on direct relationships and combinations of direct and indirect relationships. An example of a direct relationship may be the relationship of two sets of data that form an associated unit of data. A direct relationship may also be a direct relationship between two associated units of data.

An indirect relationship may exist when a direct relationship does not exist but when data are indirectly connected. For example, an indirect relationship may exist between the first associated unit of data and the third associated unit of data when the first associated unit of data is directly related to the second associated unit of data and the second associated unit of data is directly related to the third associated unit of data. Many other examples of direct and indirect relationships may be possible.

Further, an associative memory may include a content-addressable structure. A content-addressable structure may provide the associative memory with the capability to be queried based on the content in the associative memory or the plurality of data itself, rather than on addresses associated with the data in the associative memory. In some cases, the content-addressable structure may allow the associative memory to map input patterns in the plurality of data to output patterns in the plurality of data.

In these illustrative examples, data entities 120 may form at least a portion of the plurality of data stored in associative memory 130. As used herein, "at least a portion" may be some or all of associative memory 130. Memory generator 113 may store data entities 120 in associative memory 130. In particular, memory generator 113 may identify types 122 of data entities 120 and store data entities 120 by types 122. As one illustrative example, for each data entity identified, memory generator 113 may determine the particular type for that data entity. Memory generator 113 may store the data entity in associative memory 130 in association with the data entities of the same particular type. When the particular type for the data entity is a new type, memory generator 113 may create a new list of data entities for the data entity of the new type.

Types 122 of data entities 120 may include, for example, but are not limited to, first type 124, second type 126, and third type 128. Of course, depending on the implementation, types 122 of data entities 120 may include any number of types.

Additionally, for each data entity identified, memory generator 113 may identify a set of attributes for that data entity. As used herein, a "set of" items means zero or more items. For example, a set of attributes may be zero or more attributes. In this manner, a set of attributes may be a zero or null set. Further, an "attribute", as used herein, may be a specific feature or piece of information related to a data entity.

In one illustrative example, data entity 138 may be an example of one of data entities 120 identified by memory generator 113. Memory generator 113 may then identify data entity 138 as being of first type 124 and may store data entity 138 in associative memory 130 as belonging to first type 124. In this manner, data entity 138 may be stored in association with other data entities of first type 124.

Further, memory generator 113 may identify set of attributes 119 for data entity 138. Further, memory generator 113 may identify an attribute type for each of set of attributes 119. In particular, memory generator 113 may identify set of attribute types 117 for set of attributes 119. Memory generator 113 may store set of attributes 119 in association with data entity 138 according to set of attribute types 117.

In some cases, two or more of data entities 120 may have attributes of the same attribute type. Further, in some cases, when a first data entity and a second data entity both have attributes of a same attribute type, one or more of the attributes for the first data entity may be the same as one or more of the attributes for the second data entity.

As one illustrative example, an attribute type may be selected from one of cost, an offset credit, government matching funds, a number of people on a project, a number of tasks for a project, a project deadline, a number of devices of a particular type being used in a project, a type of material, an identification number, or some other suitable attribute type. This list of possible attribute types for a data entity is not limiting of the claimed inventions, as the illustrative embodiments contemplate many possible attributes other than those listed above. An attribute of a particular attribute type may then be the value for that attribute type belonging to the corresponding data entity.

For example, data entity 138 may be a part for an aircraft. One of set of attributes 119 for data entity 138 may be plastic. Plastic may belong to an attribute type in set of attribute types 117 that is a type of material. Set of attributes 119 for data entity 138 may include any number of attributes for each of set of attribute types 117.

In this manner, memory generator 113 may store information 116 for projects 106 in a manner that allows associations between same or similar pieces of information to be formed in associative memory 130. The storing of data entities 120 in associative memory 130 may allow groups of related projects in projects 106 to be more easily and quickly identified as compared to grouping projects using currently available systems.

Project analyzer 114 may use associative memory 130 to analyze projects 106. For example, project analyzer 114 may include first report generator 123 and second report generator 125. In these illustrative examples, first report generator 123 may be configured to use associative memory 130 to generate first report 127 identifying information related to area of interest 129. Area of interest 129 may be, for example, without limitation, a topic, a theme, a type of subject matter, a focus, or some other suitable type of area of interest with respect to projects 106.

First report generator 123 may include query generator 131. Query generator 131 may be configured to identify number of data entities 144 related to area of interest 129 using associative memory 130. Number of data entities 144 may be referred to as a "cluster" in some cases.

In particular, query generator 131 may use number of selected criteria 132 to group any data entities in data entities 120 stored in associative memory 130 related to area of interest 129. In other words, query generator 131 may use number of selected criteria 132 to group a portion of data entities 120 related to area of interest 129 into a cluster.

In these illustrative examples, number of selected criteria 132 may be initially received in user input. The user input may be received through, for example, a graphical user interface configured for display on a display system. In one illustrative example, the graphical user interface may allow a user to enter number of selected criteria 132 in the form of a query using the graphical user interface.

Number of selected criteria 132 may be a number of search terms. These search terms may include, for example, without limitation, a word, a string of words, a phrase, one or more keywords related to area of interest 129, a word or phrase identifying area of interest 129, an image, an audio file, a series of symbols and/or alphanumeric characters, and other suitable search terms by which data entities 120 stored in associative memory 130 may be searched.

Query generator 131 may use number of selected criteria 132 to identify number of data entities 144 related to area of interest 129. Thereafter, query generator 131 may use number of data entities 144 to identify set of new criteria 146 that can be added to number of selected criteria 132. Set of new criteria 146 may be identified based on the types of data entities within data entities 120, the attributes associated with each of number of data entities 144, and/or other suitable information. In some cases, a user may be able to view set of new criteria 146 and refine set of new criteria 146 by removing and/or modifying one or more criteria in set of new criteria 146.

Query generator 131 may add set of new criteria 146 to number of selected criteria 132 to form modified criteria 147. Query generator 131 may then use modified criteria 147 to identify number of data entities 144 related to area of interest 129.

The process of identifying set of new criteria 146 using number of data entities 144, forming modified criteria 147 using set of new criteria 146, and then identifying number of data entities 144 using modified criteria 147 may be repeated until set of new criteria 146 is null and/or no longer contains search terms that are meaningful and/or similar. Depending on the implementation, this process may be halted by query generator 131 and/or a user.

When the final number of data entities 144 has been identified, first report generator 123 may generate first report 127 using number of data entities 144. First report generator 123 may identify number of data entities 144 by type, each set of attributes 119 associated with each of number of data entities 144, and/or other suitable information about number of data entities 144 in first report 127.

In these illustrative examples, second report generator 125 may be configured to generate second report 150 identifying number of clusters 134 that includes data entities for projects in projects 106 that are related. These projects may be related in a number of different ways. For example, projects in a cluster may be related when the information for these projects is related in some manner. As another example, projects in a cluster may be related by being related to a particular area or subject of interest.

As one illustrative example, second report generator 125 may use entity analytics engine 136 to identify correlations between data entities 120 stored in associative memory 130. Entity analytics engine 136 may compare data entities 120 to each other to identify correlations between data entities 120. For example, for each data entity in data entities 120 stored in associative memory 130, entity analytics engine 136 may determine whether that data entity belongs to a cluster in number of clusters 134.

Data entity 138 may be an example of one of data entities 120. Cluster 140 may be an example of one of number of clusters 134. Entity analytics engine 136 may determine whether data entity 138 belongs to cluster 140 by comparing data entity 138 with a number of data entities already present in cluster 140.

These comparisons may be made based on preselected criteria and/or criteria entered by a user. As one illustrative example, data entity 138 may be compared with the number of data entities already present in cluster 140 to determine whether data entity 138 shares one or more attributes with these other data entities in cluster 140. In some cases, data entity 138 may be compared to the number of data entities in cluster 140 based on the attributes and/or other pieces of information in associative memory 130 that are associated with the number of data entities in cluster 140.

In comparing data entity 138 with the number of data entities already present in cluster 140, entity analytics engine 136 may generate similarity score 142 based on these comparisons. Entity analytics engine 136 may then determine whether similarity score 142 is greater than a selected threshold. If similarity score 142 is greater than the selected threshold, project manager 112 may add data entity 138 to cluster 140.

In these illustrative examples, second report generator 125 may be configured to generate second report 150 using number of clusters 134 formed by project manager 112. In one illustrative example, project analyzer 114 may be configured to generate second report 150 based on aggregate value 152 for each cluster in number of clusters 134.

In one illustrative example, aggregate value 152 may be for a particular attribute type shared by the number of data entities in a cluster. For example, aggregate value 152 may be a sum of values for the attributes of a particular attribute type shared by the data entities in a cluster. As one illustrative example, aggregate value 152 may be a total number of data entities in the cluster. As another illustrative example, aggregate value 152 may be a sum of the cost of the projects in a cluster, or some other suitable type of value.

Second report generator 125 may add any cluster in number of clusters 134 having aggregate value 152 greater than a selected threshold to set of clusters 154 selected for generating second report 150. This selected threshold may be selected such that a cluster having aggregate value 152 greater than the selected threshold may be identified as warranting further intention.

Second report generator 125 may then generate second report 150 using the data entities in set of clusters 154. Second report 150 may be used to manage projects 106 undertaken by number of organizations 102. Further, second report 150 may be used to identify a number of operations that may improve efficiency in completing projects 106.

The illustration of a project management environment in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, project analyzer 114 may be part of project manager 112. Further, depending on the implementation, at least a portion of project manager 112 and/or project analyzer 114 may be implemented in associative memory 130.

In some illustrative examples, data entities 120 may be stored in more than one associative memory. In these examples, project manager 112 may be configured to manage information 116 for projects 106 across these multiple associative memories.

Figure 2:
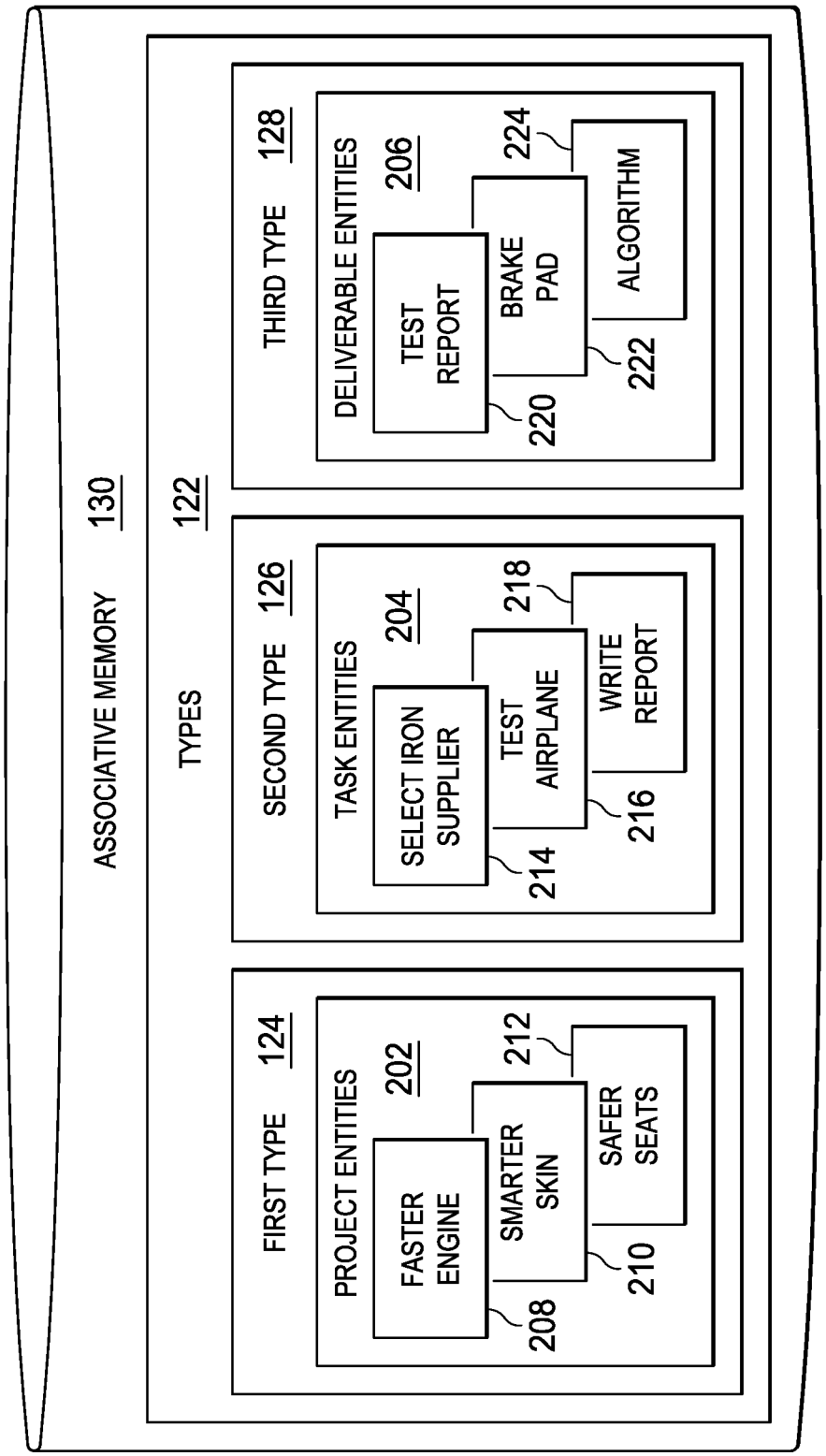
FIG. 2 is an illustration of an associative memory in the form of a block diagram in accordance with an illustrative embodiment.

FIG. 2 is an illustration of an associative memory in the form of a block diagram depicted in accordance with an illustrative embodiment. In this illustrative example, associative memory 130 from FIG. 1 is described in greater detail.

As depicted, data entities 120 from FIG. 1 are stored in associative memory 130 based on types 122 of data entities 120. Types 122 may include first type 124, second type 126, and third type 128 in this illustrative example. Of course, in other illustrative examples, types 122 may include any number of types.

First type 124 may be, for example, without limitation, project entities 202. Second type 126 may be, for example, task entities 204. Third type 128 may be, for example, deliverable entities 206. Of course, in other illustrative examples, first type 124, second type 126, and/or third type 128 may be other suitable types of data entities.

A data entity in project entities 202 may be, for example, a particular project. A data entity in task entities 204 may be, for example, a task for the particular project. As used herein, a "task" may comprise any number of operations that may be performed to achieve a specific goal. For example, a task may be generating a report on temperature changes for a particular technology. As another example, a task may be performing an inspection. As yet another example, a task may be tightening a screw on a specific part.

Further, a data entity in deliverable entities 206 may be, for example, a deliverable produced by a particular project. As used herein, a "deliverable" may be a description of any tangible or intangible product produced as a result of a project that is intended to be delivered to a customer or client. For example, without limitation, a deliverable may be a report, a document, a software upgrade, an electronic device, a goal or outcome of a project, or some other suitable type of item.

Each of project entities 202, task entities 204, and deliverable entities 206 may include any number of data entities. As one illustrative example, project entities 202 in associative memory 130 may include data entity 208, data entity 210, and data entity 212. Task entities 204 may include data entity 214, data entity 216, and data entity 218. Deliverable entities 206 may include data entity 220, data entity 222, and data entity 224.

Figure 3:
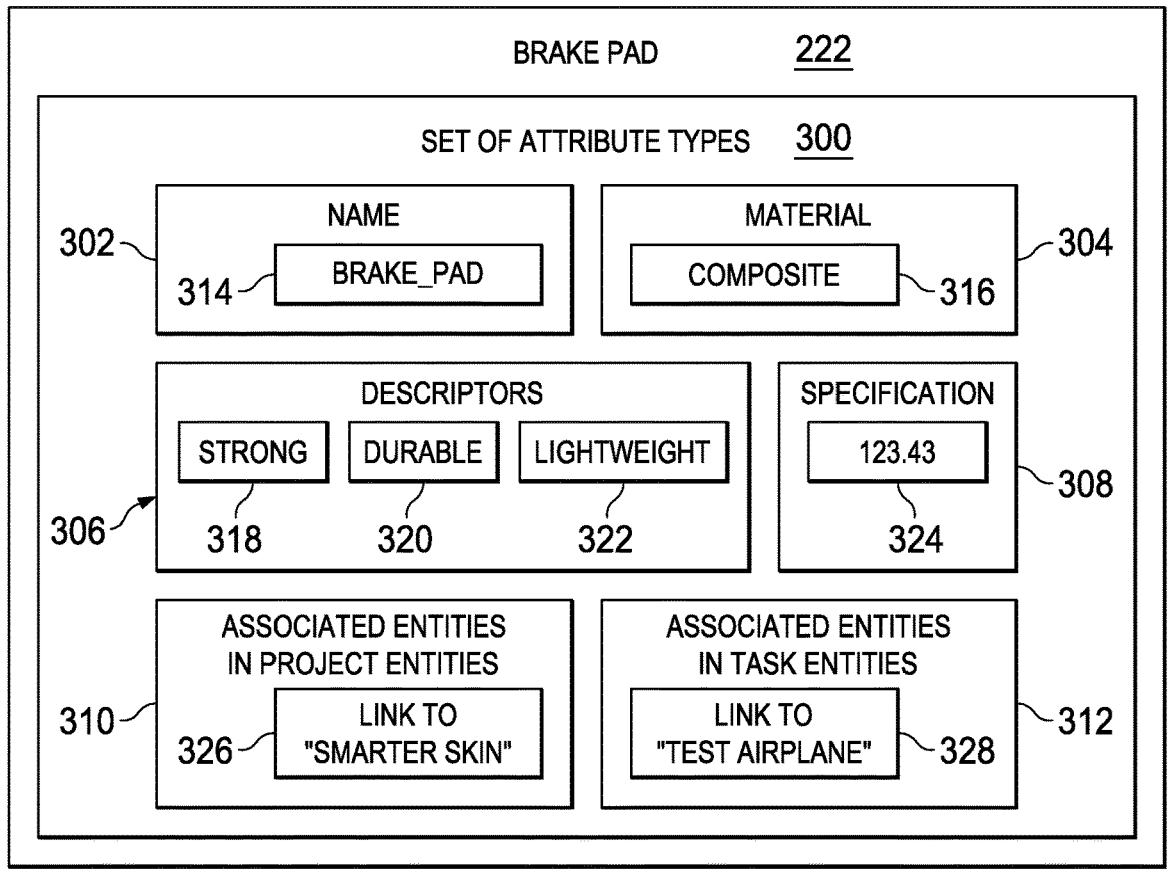
FIG. 3 is an illustration of a data entity stored in an associative memory in the form of a block diagram in accordance with an illustrative embodiment.

FIG. 3 is an illustration of a data entity stored in an associative memory in the form of a block diagram depicted in accordance with an illustrative embodiment. In this illustrative example, data entity 222 in deliverable entities 206 from FIG. 2 is described in greater detail.

Data entity 222 may be stored in associative memory 130 with attributes for data entity 222 organized into set of attribute types 300. In this illustrative example, set of attribute types 300 may include name 302, material 304, descriptor 306, specification 308, associated entities in project entities 310, and associated entities in task entities 312.

Name 302 may be unique for data entity 222. In other words, data entity 222 may have only one attribute for name 302 that identifies the name of data entity 222. As depicted, attribute 314 may be the name of data entity 222. Material 304 may be a type of material associated with data entity 222. In other words, any attribute that is a type of material may be stored in data entity 222 as belonging to material 304. In this illustrative example, data entity 222 has attribute 316 that belongs to material 304. Of course, in other illustrative examples, data entity 222 may have more than one attribute belonging to material 304.

Any attribute that describes data entity 222 may be stored as belonging to descriptor 306. As depicted, attribute 318, attribute 320, and attribute 322 belong to descriptor 306. Any attribute that identifies a particular product specification associated with data entity 222 may be stored as belonging to specification 308. In this illustrative example, data entity 222 may have attribute 324 belonging to specification 308.

Further, any attribute that identifies a data entity in project entities 202 from FIG. 2 that is associated with data entity 222 may belong to associated entities in project entities 310. Similarly, any attribute that identifies a data entity in task entities 204 from FIG. 2 that is associated with data entity 222 may belong to associated entities in task entities 312.

In this illustrative example, attributes belonging to associated entities in project entities 310 and associated entities in task entities 312 may be associated with links to the actual data entities in associative memory 130 associated with data entity 222. For example, attribute 326 belonging to associated entities in project entities 310 may be associated with a link to data entity 212 in associative memory 130 in FIG. 2. Further, attribute 328 belonging to associated entities in task entities 312 may be associated with a link to data entity 216 in associative memory 130 in FIG. 2.

Figure 4:
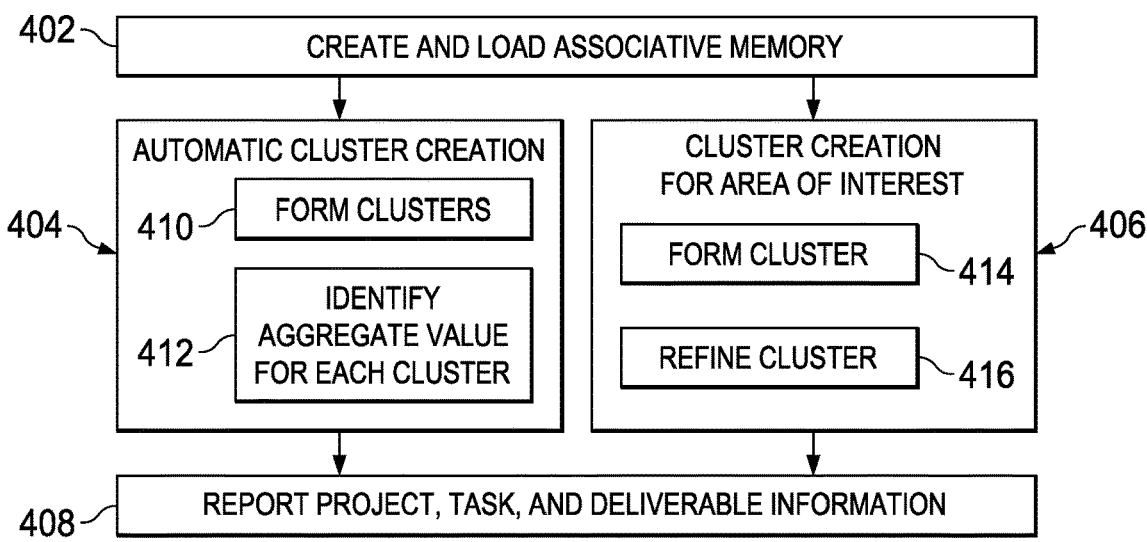
FIG. 4 is an illustration of an operational flow in the form of a block diagram in accordance with an illustrative embodiment.

FIG. 4 is an illustration of an operational flow in the form of a block diagram depicted in accordance with an illustrative embodiment. In this illustrative example, operations 400 may be performed using project management system 104 in FIG. 1 to generate a report containing information about projects. As depicted, operations 400 may include operation 402, operation 404, operation 406, and operation 408.

In this illustrative example, operation 402 may be performed to create and load an associative memory, such as associative memory 130 in FIG. 1. In operation 402, data entities, such as data entities 120 in FIG. 1, may be stored in the associative memory. These data entities may be of the types, for example, project entities, task entities, and deliverable entities. A user may select operation 404, operation 406, or a combination of the two for generating the report.

Operation 404 may be performed to automatically create clusters of data entities using the data entities stored in the associative memory and, in particular, to automatically create clusters for project, task, and deliverable information and/or information for any other type of entity. In operation 404, operation 410 may be performed to form the clusters using the data entities stored in the associative memory. Further, operation 412 may be performed to identify an aggregate value, such as aggregate value 152 in FIG. 1, for each of the clusters formed. In operation 412, clusters having aggregate values greater than some selected threshold may be selected for the report.

In addition to operation 404, or perhaps alternatively to operation 404, operation 406 may be performed to create a cluster of data entities related to a particular area of interest. In operation 406, operation 414 may be performed to form the cluster using the data entities stored in the associative memory. Further, operation 416 may be performed to refine the cluster of data entities a number of times using search terms identified from the data entities in the cluster. Operation 414 and operation 416 may be performed using, for example, query generator 131 in FIG. 1.

In this illustrative example, operation 408 may be performed to generate a report using the clusters selected for the report in operation 404 and/or operation 406. In particular, the report may include information about the projects, tasks, and deliverables represented in the data entities in the clusters.

In this manner, the different illustrative embodiments may use associative memory and entity analytics technology coupled with a custom user interface to enable portfolio managers to rapidly identify and group or "cluster" projects across one or more organizations that are similar. These projects may be clustered based on the matching of related and unrelated, but similar, attributes. Further, the different illustrative embodiments may benefit from the consolidation of effort and/or the sharing of knowledge and resources.

The different illustrative embodiments provide a system that may reduce the amount of time and effort needed for a portfolio manager to identify groupings or "clusters" of related or similar projects across a company or organization. Project information may include descriptions, tasks, deliverables, and/or other suitable information. The illustrative embodiments contemplate other types of project information. Project information may be maintained and tracked using a variety of applications, some off-the-shelf and some custom-built. As a result, project information may be stored in a variety of formats.

Additionally, remembering all projects, corporate-wide, may be extremely difficult for a portfolio manager because of one or more factors, including possibly the pace at which a workplace moves, the separation of project information due to fixed categorization of research and development projects, differing departmental or organizational practices, security, politics, and possibly simple ignorance. Further, these factors may make it extremely difficult for a portfolio manager to be able to recall "actionable" information with which to identify potential cost savings or greater efficiencies from shared knowledge.

Existing solutions may involve primarily manual, human analysis which may require extensive effort, including months or even years of time spent by one or more individuals or even an entire department of an organization. Calendar time can be mitigated through the use of multiple resources, such as multiple analysts or multiple portfolio managers. However, using multiple resources may negatively impact cost and efficiency.

Assuming a portfolio manager is able to remember all project tracking methods and applications across departments and organizations within a company, the process of searching for and collecting project information may remain largely a manual task involving the use of multiple applications and search tools. To complicate matters, multiple project tracking applications may mean multiple data stores which have been populated by multiple individuals who may or may not share a common vernacular when describing project information.

For example, multiple individuals may not use the same acronyms to describe a same term, may use "slang" terms, may use synonyms, or may refer to a term by an unexpected name such as a non-technical term. As a result, across a great plurality of projects, a large number of variables may stand in the way of a portfolio manager trying to collect each similar project record and then remember and derive "knowledge" or actionable information from many project records from multiple applications in multiple formats entered by multiple individuals.

Even if a company used only one project tracking application that had a uniform searching function, the project tracking application would return a grouping of projects based on the existence of whatever keyword that happens to match the keywords in the project records. The portfolio manager would still have no way of determining similarities or differences between the project records returned. The task of identifying related or similar projects and/or the degree of similarity between those projects may require that each project record must be read and the data from the project record summarized and aggregated.

Another factor may be the experience of the portfolio manager reviewing the projects. An experienced portfolio manager who has spent many years developing knowledge of tracking and managing organizations or companies may more rapidly recall and identify similarities between projects than a portfolio manager without that breadth of experience. The cost of that experience may be time, years of both successful and failed projects, money made and money lost, and the lessons learned from every decision made. In an effort to reduce the time required to accumulate the human experience that produces such knowledge, analysts have attempted to use various tools to assist in this process. Tools that human analysts use may be rule-based models, relational databases and query systems, and data mining systems.

However, existing systems may not allow for whole text capture. As a result, these systems may be limited in their ability to relate data entities, such as project entities, and their attributes, such as cost, technology, and location, in a complex and subtle manner.

Further, modern data mining solutions may be reductive, potentially losing otherwise useful information. For example, the subtleties of the data that often are important in determining desirable patterns that do not repeat often, many times may be lost. As a result, a portfolio manager may overlook a project whose description did not contain the keyword that would otherwise be flagged if present. The keyword may be, for example, an acronym. Additionally, data mining solutions may be time-consuming and costly in terms of manpower hours.

Further, with existing systems, much of the association data between entities may be lost because entities may be "forced" into being characterizing by pre-defined characteristics. For example, many database systems may have drop-down menus that allow for only certain categories to be chosen. These categories may not contain enough detail to adequately address all the associations between entities. As a result, relationships that can be of vast assistance in determining a desired result or assisting in an analytical process may be omitted.

For example, a relational database might force Project A to be described as "Spares Tracking System Development". Free text might describe the project as "java-based UI sub-application to display company information of supplier", which may provide a better indication of what the project is truly about. Project B might be described the same way by the relational database, "Spares Tracking System Development". However, the free text for Project B might be "RF Technical 12 tags".

Additionally, the relational database may force Project C to be described as "Contract Management Tasks", while the free text might be "java-based UI sub-application to display company information of contractor". The analysis of these projects may indicate that Project A and Project C are more related than Project A and Project B even though Project A and Project B are placed into the same database category.

Further, project tracking software may also contribute to categorization problems by forcing a user to categorize a project, for instance, by technology maturity. If too few categories from which to choose are present, projects may be incorrectly categorized because the user is choosing the "closest" matching category. In this case, the result may be a few categories with a large number of clustered projects, some clustered improperly.

As another example, when too many categories are defined, the result may be many categories, some possibly irrelevant, with just a few clustered projects in them, if any. Further, rule-based systems may tend to be fragile and non-reactive to changing business conditions.

The different illustrative embodiments described herein may enable a portfolio manager or user to identify projects, across an organization or company, which are the most similar or find projects that are related to an arbitrary area of interest. The different illustrative embodiments may leverage associative memory technology to rapidly evaluate large volumes of data in multiple formats to identify and group or "cluster" similar projects. Those "clustered" projects may be either related to each other or related to an area of interest.

In one illustrative embodiment, two different steps may be used. The first step may be the creation or loading of the associate memory. This first step may be implemented using operation 402 in FIG. 4 as described herein. The second step may be the analysis of the information. The second step may provide the user with two options. The first option may be to create clusters of projects based on the information in the projects. This first option may be implemented using operation 404 as described herein. The second option may be to create a cluster of projects that relate to an area of interest. This second option may be implemented using operation 406 as described herein.

In the first step, operation 402, a specific associative memory may be created by aggregating current and historical data from project tracking applications throughout a department, organization, or company. The associative memory may remember entities, attributes for the entities, and the associations/relationships relevant to the projects described in the data sources. These entities may also be referred to as data entities. These data entities may include, for example, projects, tasks, deliverables, and/or other suitable entities.

The attributes may include, for example, description, work breakdown structure, and/or other suitable attributes. The description may be, for example, without limitation, "spares tracking" or "finance systems development". The work breakdown structure may be, for example, design security user interface, data conversion, or testing.

With the first option for the second step, operation 404, entity analytics on the associative memory may be used to provide high value correlations between data entities to identify and create clusters of similar projects once all the information associated with the projects, the tasks, and the deliverables is remembered for a period of time. With this first option, each of the entities may be compared with every other entity, and those groups of entities that are highly correlated may be investigated to identify information, such as cost, similar technologies and/or resources, best practices, and/or duplication of effort.

As one illustrative example, a first organization within a company may require the use of a testing facility to perform acceptance testing for an aircraft component that requires specific conditions and setup procedures. A second organization in the company may develop a component that requires similar conditions for testing as the conditions used for testing the aircraft component developed by the first organization, even though the components and the projects, at first glance, appear to be unrelated. The first organization may be unaware of the testing conditions required by the second organization for testing the component developed by the second organization.

The time and resource savings that could be realized by combining the use of the testing facility may mean actual dollar reductions in the cost of producing the different components. Similarly, multiple software development teams, due to a lack of awareness of others efforts, could be buying single license copies of a development tool when purchasing an enterprise license. Purchasing multiple licenses at a time may reduce the cost of the software and the time required to install the development tool. For example, time and cost may be reduced by installing a single server package as compared to installing separate software packages. In both cases, different illustrative embodiments may provide project visibility and "actionable intelligence" that can lead to informed decisions that result in cost savings for the company.

With the second option for the second step, operation 406, a description entity composed of a list of search terms may be developed. The description entity may be related to any particular topic or area of interest. The description entity may be iteratively refined against the associative memory to the point of maximum value. In other words, the terms in the list may identify the most number of similar, meaningfully related attributes before reaching a point of diminishing returns by generating meaningless or incorrect entity matches. Once the description entity has been created, the description entity may be used to find all projects that match the search terms.

The different illustrative embodiments may be applicable to any scale of commercial or governmental system, process, or product. However, the value of the method and apparatus for managing projects provided by the different illustrative embodiments may increase significantly as the size and complexity of the system, process, or product increases because the cluster identification process may become exponentially more difficult even as the possibility of synergies increases.

In particular, the different illustrative embodiments may provide an entity analytic cluster memory. This entity analytic cluster memory may be an associative memory that is capable of discovering highly similar research and development projects.

The different illustrative embodiments provide a method and apparatus that handles unstructured, ambiguous, free text data by breaking the text down into recognizable and comparable units, without limiting any data. Further, the different illustrative embodiment may avoid use of reductive algorithms or rules like other currently available search tools. The different illustrative embodiments may return a rank-ordered list of entities that are relevant to the terms contained in a query generated by a user.

The different illustrative embodiments provide a method and apparatus that may arrive at solutions and identify clusters more efficiently and quickly than currently available manual or automated tools. Currently available relational database manipulation tools may find keywords. However, the perspective may be that of the relational database designer, not the entity that relates to the current problem. Relational databases may not account for all the entities that reside in the free text and may fail to understand those characteristics that make projects uniquely similar and not similar because they have the same terms.

Figure 5:
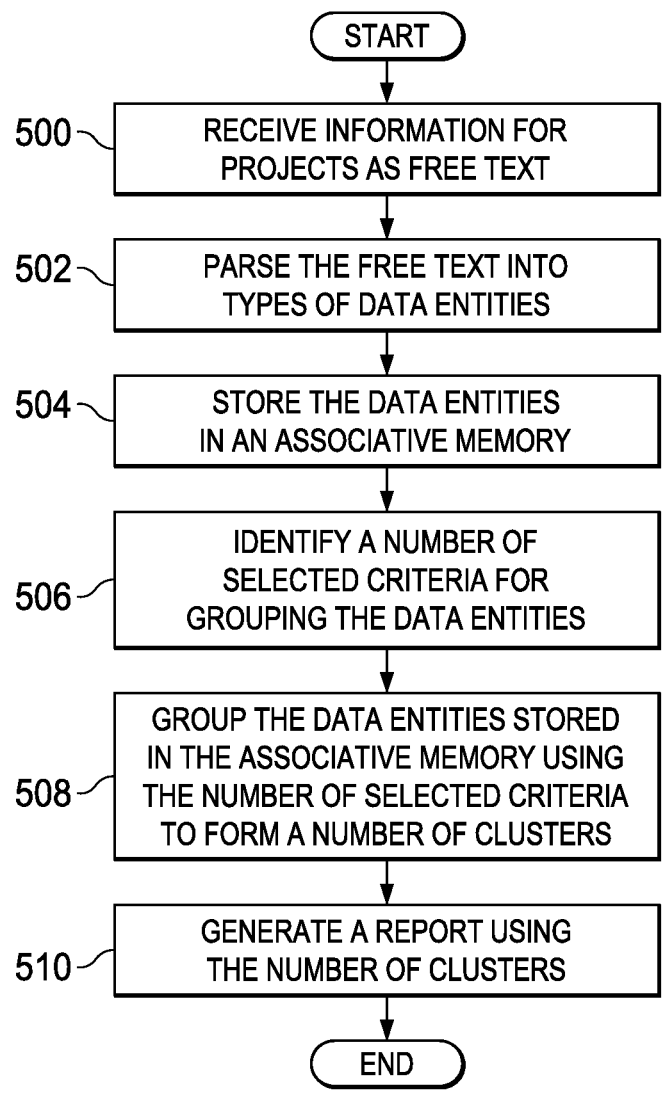
FIG. 5 is an illustration of a process for managing information for projects in the form of a flowchart in accordance with an illustrative embodiment.

FIG. 5 is an illustration of a process for managing information for projects in the form of a flowchart depicted in accordance with an illustrative embodiment. The process illustrated in FIG. 5 may be implemented using project management system 104 in FIG. 1. As used herein, the term "project management system" need not be limited to project management system 104 in FIG. 1 but may also include any processor or set of processors used together with a non-transitory computer readable medium in order to effectuate the operations described herein.

Further, the process illustrated in FIG. 5 may be implemented using one or more processors, possibly in a networked or distributed environment, such as, but not limited to, processor unit 1104 of FIG. 11. The process illustrated in FIG. 5 may be implemented using software, hardware, or a combination thereof, but, in particular, may be used in conjunction with an associative memory.

Further, although one or more of the operations in FIG. 5 may be described as being performed by a project management system, one or more of the operations described herein may be performed by an associative memory, such as associative memory 130 in FIG. 1. Further, one or more of the operations may be performed by project manager 112, project analyzer 114, data processing system 1100 in FIG. 11, or by any suitable software component, hardware component, or combinations thereof.

The process may begin by the project management system receiving information for projects as free text (operation 500). In operation 500, a number of project tracking applications may be used to retrieve information for the projects in the form of free text. The project management system may then parse the free text into types of data entities (operation 502). In operation 502, the types may include, for example, a project entity, a task entity, and a deliverables entity. Although the illustrative embodiments contemplate receiving information in the form of free text, the illustrative embodiments also contemplate receiving other types of information including pictures, video, coded text, and many other forms of data.

The project management system may store the data entities in an associative memory (operation 504). In this manner, the project management system may store the information for the projects as data entities in the associative memory.

Thereafter, the project management system may identify a number of selected criteria for grouping the data entities (operation 506). The project management system may then group the data entities stored in the associative memory using the number of selected criteria to form a number of clusters (operation 508). Then the project management system may generate a report using the number of clusters (operation 510), with the process terminating thereafter.

Figure 6:
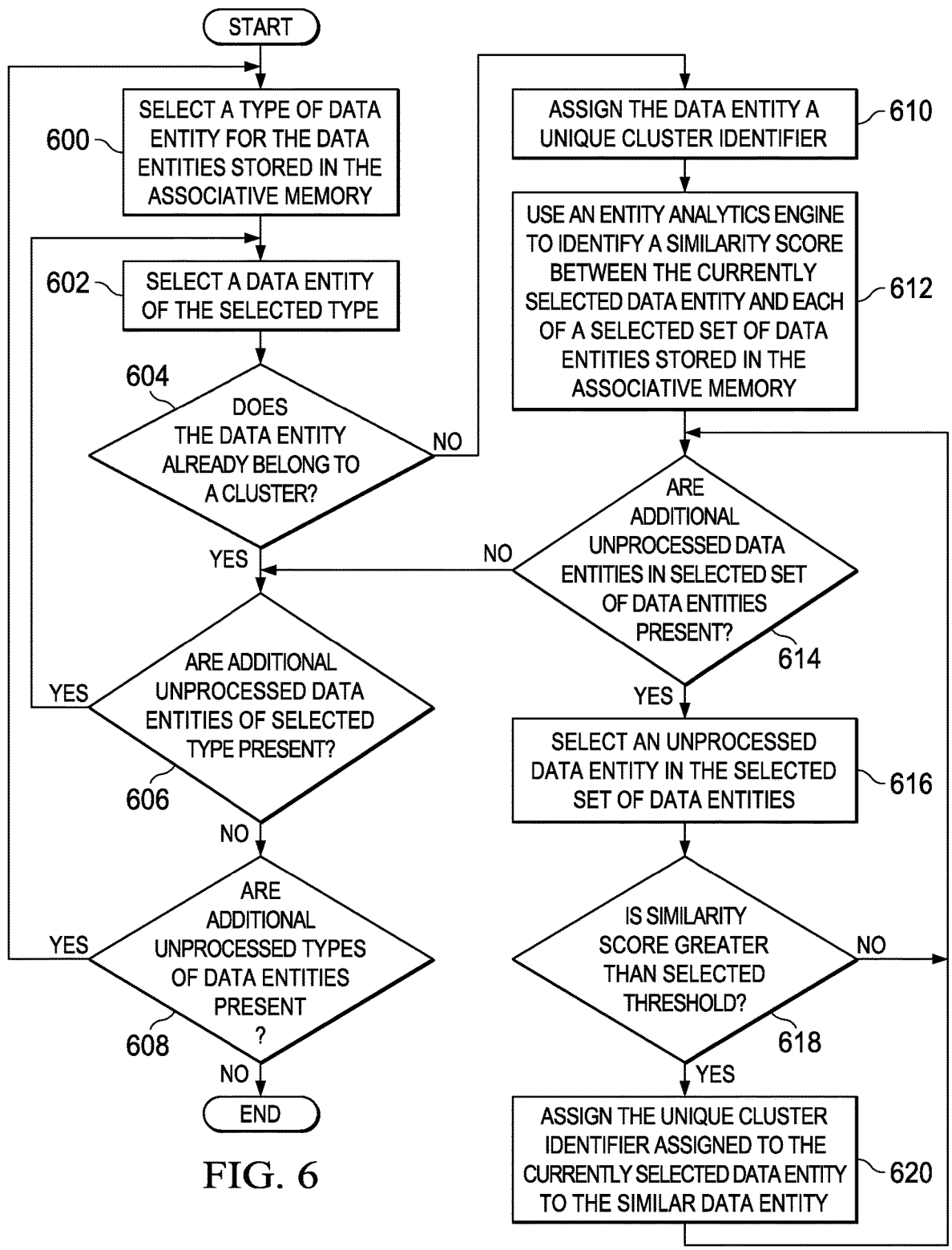
FIG. 6 is an illustration of a process for forming clusters of data entities in the form of a flowchart in accordance with an illustrative embodiment.

FIG. 6 is an illustration of a process for forming clusters of data entities in the form of a flowchart depicted in accordance with an illustrative embodiment. The process illustrated in FIG. 6 may be used to implement operation 508 in FIG. 5.

This process may be implemented using project analyzer 114 in project management system 104 in FIG. 1. As used herein, the term "project analyzer" need not be limited to project analyzer 114 in FIG. 1 but may also include any processor or set of processors used together with a non-transitory computer readable medium in order to effectuate the operations described herein.

Further, the process illustrated in FIG. 6 may be implemented using one or more processors, possibly in a networked or distributed environment, such as, but not limited to, processor unit 1104 of FIG. 11. In this manner, the process illustrated in FIG. 6 may be implemented using software, hardware, or a combination thereof, but, in particular, may be used in conjunction with an associative memory.

Further, although one or more of the operations in FIG. 6 may be described as being performed by a project analyzer, one or more of the operations described herein may be performed by an associative memory, such as associative memory 130 in FIG. 1. Further, in other illustrative examples, one or more of the operations may be performed by project manager 112, data processing system 1100 in FIG. 11, or by any suitable software component, hardware component, or combinations thereof.

The process may begin by a project analyzer selecting a type of data entity for the data entities stored in the associative memory (operation 600). The project analyzer then may select a data entity of the selected type (operation 602). Next, the project analyzer may determine whether the data entity already belongs to a cluster (operation 604).

If the data entity already belongs to a cluster, the project analyzer may determine whether any additional unprocessed data entities of the selected type are present in the associative memory (operation 606). If additional unprocessed data entities are not present, the project analyzer may determine whether any additional unprocessed types of data entities are present in the associative memory (operation 608).

If additional unprocessed types of data entities are not present, the process terminates. Otherwise, the process may return to operation 600 as described above. With reference again to operation 606, if additional unprocessed data entities are present, the process may return to operation 602 as described above.

With reference again to operation 604, if the data entity does not already belong to a cluster, the project analyzer may assign the data entity a unique cluster identifier (operation 610). In operation 610, the unique cluster identifier may identify the particular cluster to which the data entity will belong.

Thereafter, the project analyzer may use an entity analytics engine to identify a similarity score between the currently selected data entity and each of a selected set of data entities stored in the associative memory (operation 612). In these illustrative examples, the selected set of data entities may include zero or more data entities identified by the entity analytics engine as being similar to the currently selected data entity. Data entities may be identified as being similar to the currently selected data entity based on the number of selected criteria identified in operation 506 in FIG. 5.

Of course, in other illustrative examples, the selected set of data entities may be selected in some other manner. For example, the selected set of data entities may be all the data entities of the selected type stored in the associative memory other than the currently selected data entity.

The project analyzer may then determine whether any additional unprocessed data entities are present in the selected set of data entities (operation 614). In operation 614, if the selected set of data entities is a null set, the project analyzer may determine that unprocessed data entities are not present in the selected set of data entities.

If unprocessed data entities are not present in the selected set of data entities, the project analyzer may proceed to operation 606 as described above. Otherwise, the project analyzer may select an unprocessed data entity in the selected set of data entities (operation 616).

Next, the project analyzer may determine whether the similarity score between the selected unprocessed data entity and the currently selected data entity is greater than a selected threshold (operation 618). This selected threshold may be specified by a user in these illustrative examples. If the similarity score is not greater than the selected threshold, the process may return to operation 614 as described above.

Otherwise, if the similarity score is greater than the selected threshold, the selected unprocessed data entity may be considered a similar data entity to the currently selected data entity. If the similarity score is greater than the selected threshold, the project analyzer may assign the unique cluster identifier assigned to the currently selected data entity to the similar data entity (operation 620). In this manner, in operation 620, the similar data entity may be added to the same cluster as the currently selected data entity. Thereafter, the process may proceed to operation 614 as described above.

Figure 7:
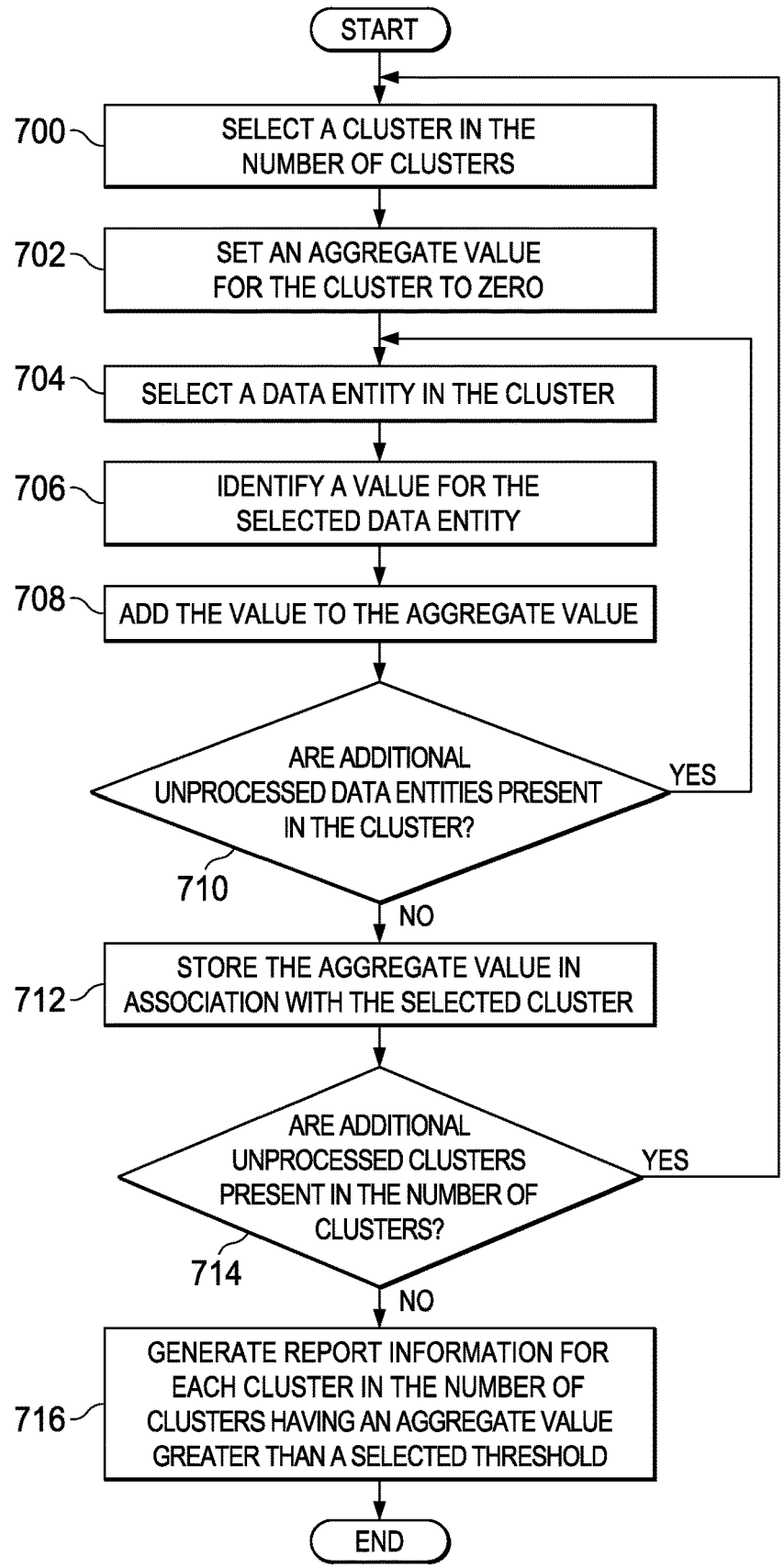
FIG. 7 is an illustration of a process for generating a report in the form of a flowchart in accordance with an illustrative embodiment.

FIG. 7 is an illustration of a process for generating a report in the form of a flowchart depicted in accordance with an illustrative embodiment. The process illustrated in FIG. 7 may be used to implement operation 510 in FIG. 5.

This process may be implemented using project analyzer 114 in project management system 104 in FIG. 1. As used herein, the term "project analyzer" need not be limited to project analyzer 114 in FIG. 1 but may also include any processor or set of processors used together with a non-transitory computer readable medium in order to effectuate the operations described herein.

Further, the process illustrated in FIG. 7 may be implemented using one or more processors, possibly in a networked or distributed environment, such as, but not limited to, processor unit 1104 of FIG. 11. In this manner, the process illustrated in FIG. 7 may be implemented using software, hardware, or a combination thereof, but, in particular, may be used in conjunction with an associative memory.

Further, although one or more of the operations in FIG. 7 may be described as being performed by a project analyzer, one or more of the operations described below may be performed by an associative memory, such as associative memory 130 in FIG. 1. Further, in other illustrative examples, one or more of the operations may be performed by project manager 112, data processing system 1100 in FIG. 11, or by any suitable software component, hardware component, or combinations thereof.

The process may begin by the project analyzer selecting a cluster in the number of clusters (operation 700). In one illustrative example, the cluster may include projects that are related to a particular area of interest. The project analyzer may then set an aggregate value for the cluster to zero (operation 702). The project analyzer may then select a data entity in the cluster (operation 704). In one illustrative example, the data entities in this cluster may be, for example, without limitation, projects. Each of these projects may have a cost attribute. In this manner, the aggregate value for the cluster may be, for example, a total cost for the projects in the cluster.

Thereafter, the project analyzer may identify a value for the selected data entity (operation 706) and may then add the value to the aggregate value (operation 708). In this illustrative example, the value may be for an attribute for the selected data entity. For example, when the selected data entity is a particular project, the value may be for a cost for the particular project.

The project analyzer may determine whether any additional unprocessed data entities are present in the cluster (operation 710). If additional unprocessed data entities are present, the process may return to operation 704 as described above.

Otherwise, the project analyzer may store the aggregate value in association with the selected cluster (operation 712). The project analyzer then may determine whether additional unprocessed clusters are present in the number of clusters (operation 714). If additional unprocessed clusters are present, the process may return to operation 700 as described above.

Otherwise, the project analyzer may generate report information for each cluster in the number of clusters having an aggregate value greater than a selected threshold (operation 716), with the process terminating thereafter. The selected information may be, for example, a total cost for the projects that is high enough to warrant further attention. The report information may include, for example, without limitation, a cost of each of the projects in the cluster, a total cost for the projects in the cluster, and other suitable information.

In some cases, no clusters in the number of clusters may have an aggregate value greater than the selected threshold. In these cases, the report information may indicate that information is not available.

Figure 8:
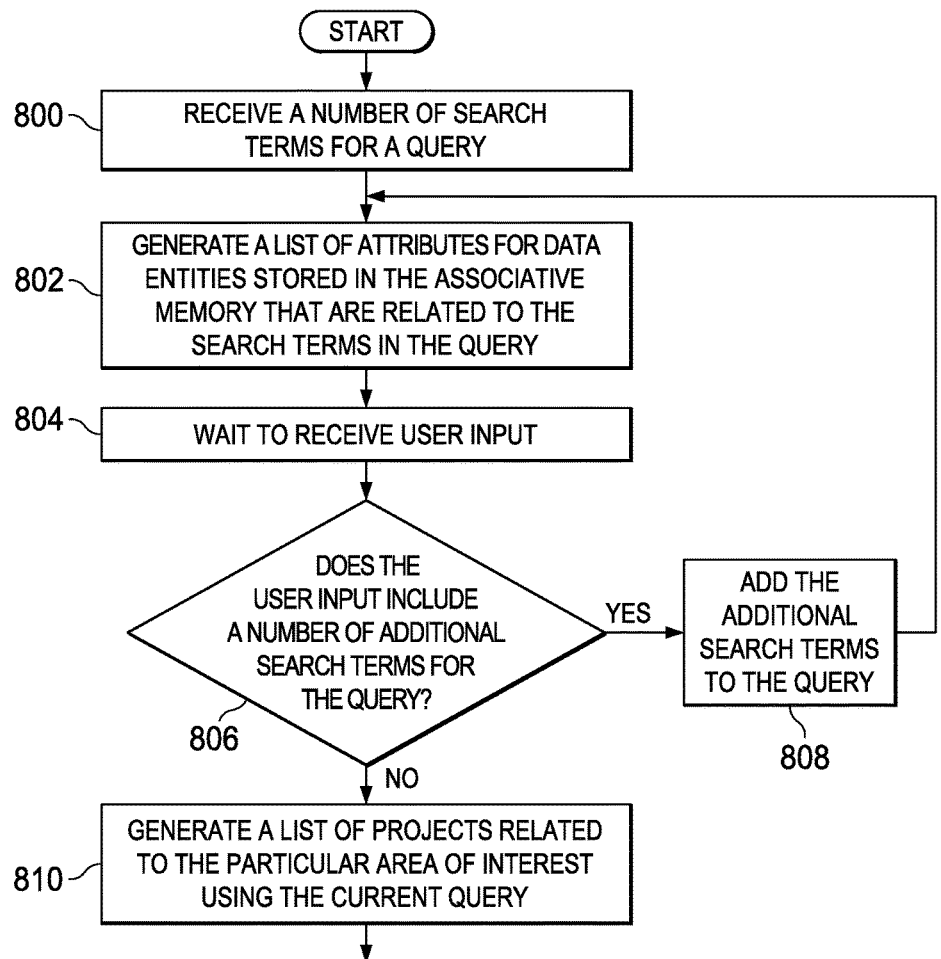
FIG. 8 is an illustration of a process for determining how much is being spent on projects related to an area of interest in the form of a flowchart in accordance with an illustrative embodiment.

FIG. 8 is an illustration of a process for determining how much is being spent on projects related to an area of interest in the form of a flowchart depicted in accordance with an illustrative embodiment. The process illustrated in FIG. 8 may be implemented using associative memory 130 in FIG. 1.

Further, the process illustrated in FIG. 8 may be implemented using one or more processors, possibly in a networked or distributed environment, such as, but not limited to, processor unit 1104 of FIG. 11. In this manner, the process illustrated in FIG. 8 may be implemented using software, hardware, or a combination thereof, but, in particular, may be used in conjunction with an associative memory.

Further, although one or more of the operations in FIG. 8 may be described as being performed by an associative memory, one or more of the operations described below may be performed by project management system 104 in FIG. 1. Further, one or more of the operations may be performed by project manager 112, project analyzer 114, data processing system 1100 in FIG. 11, or by any suitable software component, hardware component, or combinations thereof.

The process may begin by the associative memory receiving a number of search terms for a query (operation 800). In this illustrative example, the number of search terms may be received in user input entered by a user. The number of search terms may be search terms related to a particular area of interest. In other words, the query entered may be configured for identifying projects related to the particular area of interest.

The associative memory may then generate a list of attributes for data entities stored in the associative memory that are related to the search terms in the query (operation 802). The associative memory may then wait to receive user input (operation 804). In response to receiving user input, the associative memory may determine whether the user input includes a number of additional search terms for the query (operation 806).

The user input may include one or more additional search terms for the query when the user determines that one or more of the attributes in the list of attributes displayed is significantly related to the area of interest. The user may use one or more of these attributes as additional search terms for the query. In this illustrative example, when the user input does not include a number of additional search terms for the query, the user input may be a command to initiate identifying projects related to the particular area of interest using the query.

If the user input includes a number of additional search terms, the project analyzer may add the additional search terms to the query (operation 808), with the process then returning to operation 802 as described above. Otherwise, in operation 806, if the user input does not include a number of additional search terms, the associative memory may generate a list of projects related to the particular area of interest using the current query (operation 810), with the process terminating thereafter. In this illustrative example, the user may use the list of projects generated to identify which projects belong to a cluster corresponding to the particular area of interest.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware, for example, may take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, the process described in FIG. 7 may be performed only for a selected group of clusters. In some illustrative examples, the process described in FIG. 6 and the process described in FIG. 7 both may be performed by a project analyzer, such as project analyzer 114 in FIG. 1.

FIG. 9 is an illustration of pseudocode for creating and loading an associative memory depicted in accordance with an illustrative embodiment. Pseudocode 900 may be used to create and load an associative memory, such as, for example, without limitation, associative memory 130 in FIG. 1. In some cases, pseudocode 900 may be used to implement operation 402 in FIG. 4.

FIG. 10 is an illustration of pseudocode for forming clusters depicted in accordance with an illustrative embodiment. Pseudocode 1000 may be used to form clusters, such as number of clusters 134 in FIG. 1. In some cases, pseudocode 1000 may be used to implement operation 410 and/or operation 414 in FIG. 4.

FIG. 11 is an illustration of a data processing system depicted in accordance with an illustrative embodiment. In this illustrative example, data processing system 1100 may be used to implement one or more computers in computer system 110 in FIG. 1 and/or project management system 104 in FIG. 1. Data processing system 1100 includes communications fabric 1102, which provides communications between processor unit 1104, memory 1106, persistent storage 1108, communications unit 1110, input/output (I/O) unit 1112, display 1114, and associative memory 1115. In these illustrative examples, associative memory may be implemented using associative memory 1115.

Processor unit 1104 serves to execute instructions for software that may be loaded into memory 1106. Processor unit 1104 may be a number of processors, a multi-processor core, or some other type of processor, depending on the particular implementation. "A number", as used herein with reference to an item, may mean one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and other types of suitable information either on a temporary basis or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide physical or architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1106, or a cache, such as found in an interface and memory controller hub that may be present in communications fabric 1102.

Thus, the different illustrative embodiments provide a method and apparatus for managing information for projects. In particular, the different illustrative embodiments provide a method and apparatus for managing information for projects stored in an associative memory.

In one illustrative embodiment, a method is provided for managing information for projects. The information for the projects may be stored as data entities in an associative memory. The associative memory may include a plurality of data having a plurality of associations in which the data entities are included in the plurality of data. Further, the associative memory may include a content-addressable structure. The associative memory may be configured to be queried based on at least one relationship selected from a group that includes direct relationships and indirect relationships among the plurality of data. The data entities stored in the associative memory may be grouped using a number of selected criteria to form a number of clusters. A report may be generated using the number of clusters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing, the method comprising:
   storing information for projects as data entities in an associative memory;
      wherein the associative memory includes a plurality of data having a plurality of associations in which the data entities are included in the plurality of data;
      wherein the associative memory further includes a content-addressable structure; and
      wherein the associative memory is configured to be queried based on at least one relationship selected from a group that includes direct relationships and indirect relationships among the plurality of data;
   grouping the data entities stored in the associative memory to form a number of clusters; and
   using the number of clusters in a project selected from the group consisting of:
manufacturing an aircraft and performing maintenance on an aircraft.

2. The method of claim 1 further comprising:
   identifying a number of selected criteria for grouping a portion of the data entities stored in the associative memory that are related to an area of interest into a cluster in the number of clusters.

3. The method of claim 2, wherein grouping the data entities stored in the associative memory to form the number of clusters comprises:

identifying a number of data entities related to the area of interest from the data entities stored in the associative memory using the number of selected criteria.

4. The method of claim 3 further comprising:
identifying a set of new criteria based on the number of data entities identified; and
adding the set of new criteria to the number of selected criteria to form modified criteria for grouping the portion of the data entities stored in the associative memory that are related to the area of interest into the cluster in the number of clusters.

5. The method of claim 1, wherein grouping the data entities stored in the associative memory to form the number of clusters comprises:
determining whether a data entity in the data entities stored in the associative memory belongs to a cluster in the number of clusters; and
adding the data entity in the data entities to the cluster when a determination is made that the data entity belongs to the cluster.

6. The method of claim 5, wherein determining whether the data entity in the data entities stored in the associative memory belongs to the cluster in the number of clusters comprises:
comparing the data entity with a number of data entities already present in the cluster to form a similarity score using an entity analytics engine and a number of attributes associated with the data entity; and
determining whether the similarity score is greater than a selected threshold.

7. The method of claim 6, wherein adding the data entity in the data entities to the cluster when the determination is made that the data entity belongs to the cluster comprises:
adding the data entity to the cluster when the similarity score is greater than the selected threshold.

8. The method of claim 1, wherein storing the information for the projects as the data entities in the associative memory comprises:
receiving the information for the projects as free text;
parsing the free text into a first type, a second type, and a third type of the data entities; and
storing the data entities in the associative memory.

9. The method of claim 8, wherein the first type is a project entity, the second type is a task entity, and the third type is a deliverables entity.

10. The method of claim 1 further comprising:
receiving a number of selected criteria in the form of a query entered by a user, wherein the number of selected criteria comprises a number of search terms for grouping a portion of the data entities stored in the associative memory that are related to an area of interest into a cluster in the number of clusters.

11. The method of claim 1, further comprising:
generating a report using the number of clusters, wherein generating further comprises:
calculating an aggregate value for each cluster in the number of clusters;
adding any cluster in the number of clusters having the aggregate value greater than a selected threshold to a set of clusters selected for generating the report; and
generating the report using the data entities in the set of clusters.

12. The method of claim 11, wherein the aggregate value for a cluster in the number of clusters is a sum of values for attributes of a particular attribute type shared by a number of data entities in the cluster.

13. The method of claim 12, wherein the particular attribute type is selected from one of cost, an offset credit, government matching funds, a number of people on a project, a number of tasks for the project, a project deadline, a number of devices of a particular type being used in the project, a type of material, and an identification number.

14. An apparatus for managing a project, the apparatus comprising:
a project manager configured to store information for the project as data entities in an associative memory;
wherein the associative memory includes a plurality of data having a plurality of associations in which the data entities are included in the plurality of data;
wherein the associative memory further includes a content-addressable structure; and
wherein the associative memory is configured to be queried based on at least one relationship selected from a group that includes direct relationships and indirect relationships among the plurality of data; and
a project analyzer configured to group the data entities stored in the associative memory to form a number of clusters; and
a project management system configured to using the number of clusters to manage the project, the project selected from the group consisting of: manufacturing an aircraft and performing maintenance on an aircraft.

15. The apparatus of claim 14 further comprising:
a graphical user interface configured for display on a display system, wherein the graphical user interface is configured to receive user input identifying a number of selected criteria for grouping a portion of the data entities stored in the associative memory that are related to an area of interest into a cluster in the number of clusters.

16. The apparatus of claim 15, wherein the project analyzer is further configured to group the data entities stored in the associative memory to form the number of clusters by:
identifying a number of data entities related to the area of interest from the data entities stored in the associative memory using the number of selected criteria;
identifying a set of new criteria based on the number of data entities identified; and
adding the set of new criteria to the number of selected criteria to form modified criteria for grouping the portion of the data entities stored in the associative memory that are related to the area of interest into the cluster in the number of clusters.

17. The apparatus of claim 14, wherein the project analyzer is further configured to group the data entities stored in the associative memory to form the number of clusters by determining whether a data entity in the data entities stored in the associative memory belongs to a cluster in the number of clusters; and adding the data entity in the data entities to the cluster when a determination is made that the data entity belongs to the cluster.

18. The apparatus of claim 17, wherein the project analyzer is further configured to determine whether the data entity in the data entities stored in the associative memory belongs to the cluster in the number of clusters by comparing the data entity with a number of data entities already present in the cluster to form a similarity score using an entity analytics engine and a number of attributes associated with the data entity; and determining whether the similarity score is greater than a selected threshold.

19. The apparatus of claim 18, wherein the project analyzer is further configured to add the data entity in the data entities to the cluster by adding the data entity to the cluster when the similarity score is greater than the selected threshold.

20. A computer program product, comprising program code stored on a non-transitory computer readable storage medium, wherein the program code is configured to be run on a computer system to cause the computer system to:
   store information for projects as data entities in an associative memory;
      wherein the associative memory includes a plurality of data having a plurality of associations in which the data entities are included in the plurality of data;
      wherein the associative memory further includes a content-addressable structure; and
      wherein the associative memory is configured to be queried based on at least one relationship selected from a group that includes direct relationships and indirect relationships among the plurality of data;
   group the data entities stored in the associative memory to form a number of clusters; and
   use the number of clusters in a project selected from the group consisting of: manufacturing an aircraft and performing maintenance on an aircraft.

\* \* \* \* \*